Sept. 15, 1942.    G. DALKOWITZ    2,296,095
DRY SHAVER
Filed May 8, 1941    3 Sheets-Sheet 1

INVENTOR.
Godfrey Dalkowitz.
BY
ATTORNEYS

Sept. 15, 1942.  G. DALKOWITZ  2,296,095
DRY SHAVER
Filed May 8, 1941    3 Sheets-Sheet 2
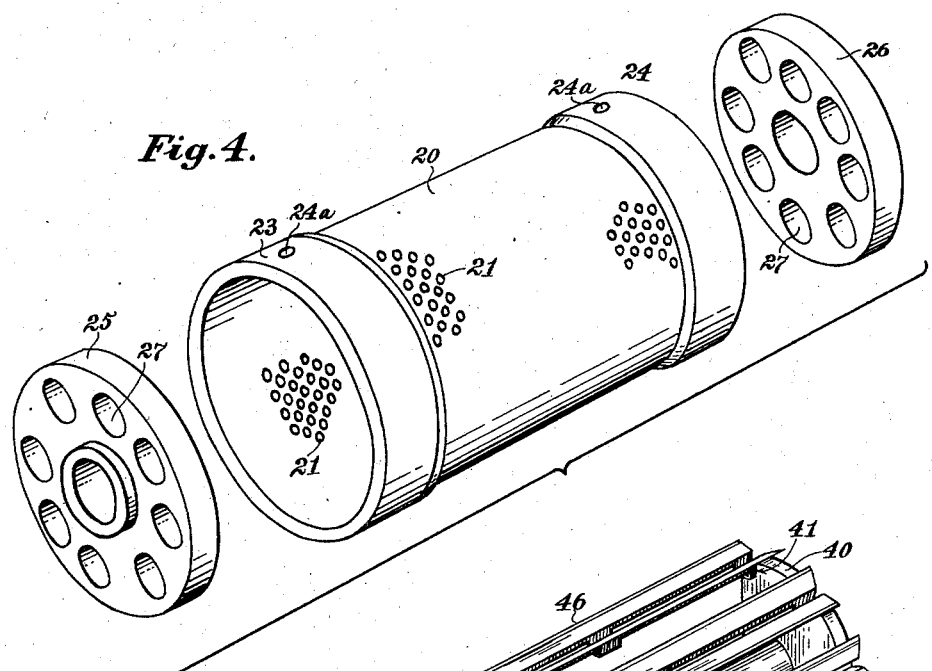
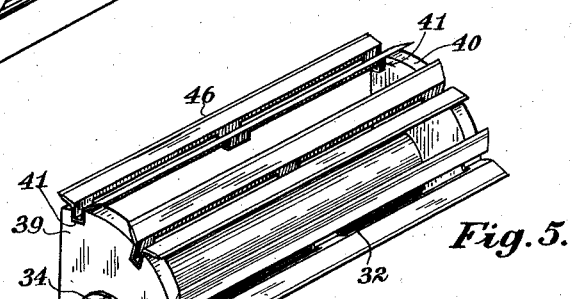
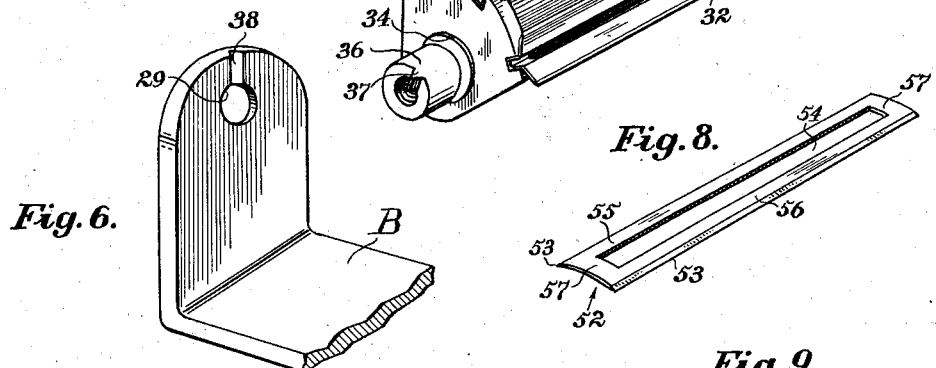
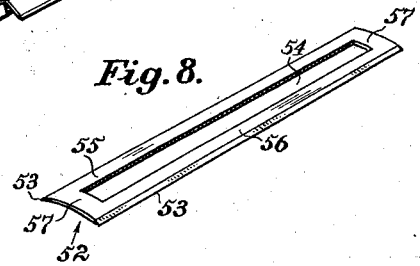
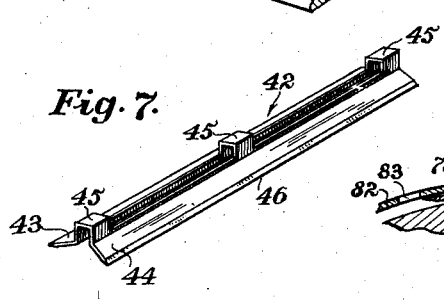
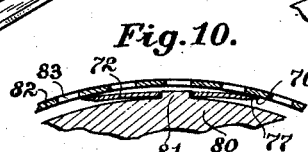
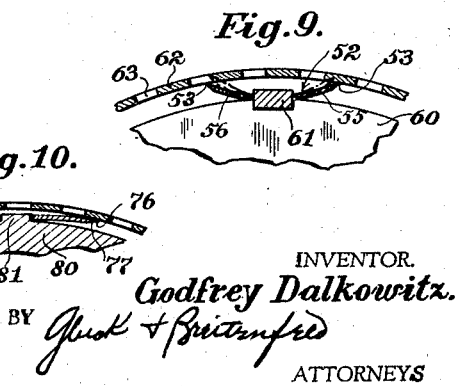
INVENTOR.
Godfrey Dalkowitz.
BY
ATTORNEYS INVENTOR.
Godfrey Dallowitz.
BY Gluck + Breitenfeld
ATTORNEYS Patented Sept. 15, 1942

2,296,095

UNITED STATES PATENT OFFICE 2,296,095

DRY SHAVER

Godfrey Dalkowitz, Brooklyn, N. Y., assignor to American Safety Razor Corporation, Brooklyn, N. Y., a corporation of Virginia Application May 8, 1940, Serial No. 333,912

9 Claims. (Cl. 30—43)

This invention relates to the appliance generally referred to as the dry shaver and in which the hairs are cut by the cooperation of two relatively movable members as the appliance is moved across the face.

In one of its aspects the invention relates to improvements in that type of dry shaver in which the relative movement of the cutting members is effected without the use of a motor and by and as the appliance is moved across the surface of the face.

The general objects of my invention are the provision of a simple, inexpensive and effective dry shaver implement which requires no experience or skill for its operation, which shaves without irritating the face and the parts of which can be readily assembled and disassembled for repair and replacement.

These objects and such other objects as will hereinafter appear or be pointed out are attained in the illustrative embodiments of my invention shown in the drawings, in which:

Figure 4 is an exploded view showing the rotatable parts of the shaving device of Figure 1 in perspective and in the order in which they are assembled;

Figure 5 is a view in perspective of the inner cutter assembly;

Figure 6 is a view in perspective of a portion of the supporting bracket and illustrates a structural detail;

Figure 7 is a view in perspective of one of the cutters;

Figure 8 is a view similar to Figure 7 of a modified form of cutter;

Figure 9 is a fragmentary transverse sectional view similar to Figure 3 showing the cutter of Figure 8 mounted in place;

Figure 10 is a view similar to Figure 9 showing a further modification;

Figure 1:
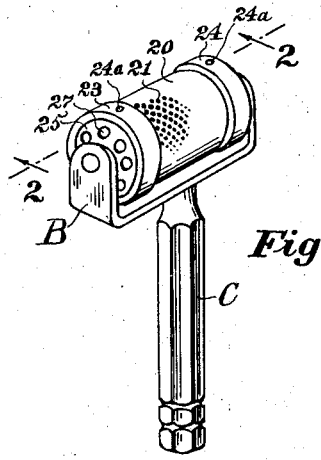
Figure 1 is a perspective view of one illustrative embodiment of my improved shaving appliance.

My shaving device comprises generally a support B serving as a base and provided with a handle C whereby to manipulate the instrument, and a shaving head comprising a face engaging member in the form of a cylindrical tube, preferably thin walled and having one or more perforations therein into which hair may enter, and a blade assembly to provide cutting edges inside said cylindrical tube.

As certain features of my invention relate peculiarly to that type of shaver in which the relative movement between the cutting edges is effected without the use of a motor and by and as the appliance is moved across the surface of the face, I show the cylindrical tube as mounted on the bracket support so that it is free to be rotated relatively thereto by traction as the instrument is moved across the face. The blade assembly on the other hand, is associated with the bracket to move therewith in the direction of translation of the shaver across the face. By this arrangement a relative movement is effected between the cutting edges of the blade assembly and the cylinder as the latter is rolled across the face, and hair entered into the perforations thereof are cut upon such relative movement.

Referring now to Figures 1 to 7 inclusive for the details of the embodiment illustrated therein, the face engaging member 20 takes the form of a hollow, perforated cylindrical drum of a material such as hardened steel. Numerous small perforations 21 in the walls thereof are shown in the drawings. These perforations provide cutting edges 22 on the inner surface of the drum, as will be readily understood and may be made sharp or keen in any preferred or desired manner as by tapering the perforations inwardly to restricted outlets. The perforations 21 are shown circular although they need not necessarily be so. At each end of the drum, the walls thereof are shown thickened, as at 23 and 24, so as to form what may be called ribs which serve to strengthen the drum 20, and which, by reason of their greater diameter cause rearward slippage over the skin, of the intermediate portions of the drum which are of less diameter. The ribs 23 and 24 are shown as without perforations. The perforated portions of the drum 20 which lie between the ribs or flanges 23 and 24 are made very thin so that a close shave may be obtained with substantially no shaving pressure.

Within each end portion of the drum is a disk 25 and 26 respectively, which closes the said end portion. A friction fit between the drum 20 and these disks serves satisfactorily to hold the disks in place and permit ready disassembly. Openings 27 shown as provided in the end closure disks 25 and 26 permit discharge of shaving waste. Oil holes 24a serve for lubrication.

The bracket B mounted on the handle C in any suitable or preferred manner is illustrated as U-shaped. Received in openings 28 and 29 in opposite ends thereof are securing means such as screws 30 or 31, threaded into the hub 32. This hub 32 which is shown as generally cylindrical has its diameter at each end reduced as shown at 33 and 34. Journal portions 35 and 36 project outwardly from the reduced portions 33 and 34 and form seats upon which the disks 25 and 26 may rotate freely. The hub 32 is held in fixed relation to the bracket B as by the lug 37 on the journal portion 36, engaging a complementary slot 38 provided in the adjacent end of the bracket B. It will be observed that by the arrangement described the hub 32 is held against turning in the bracket and that the drum 20 is rotatable relatively thereto.

Figure 3:
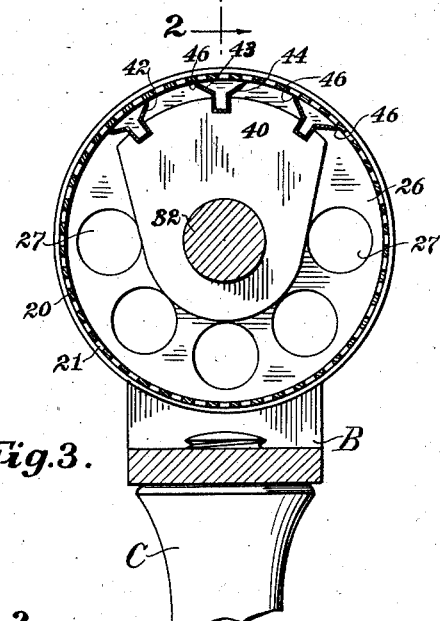
Figure 3 is a transverse sectional view taken substantially on the line 3—3 of Figure 2, looking in the direction of the arrows.
Figure 2:
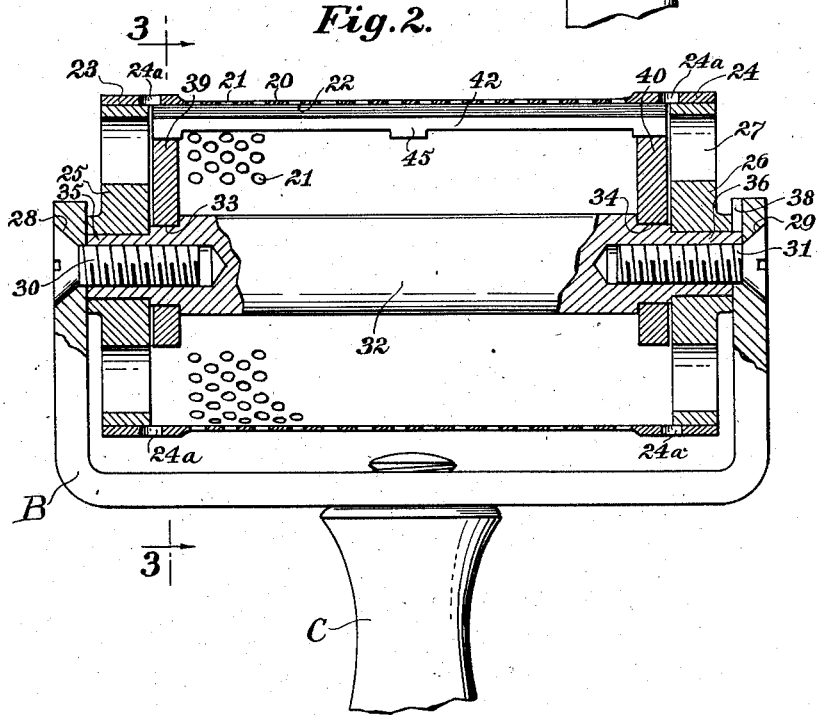
Figure 2 is a longitudinal sectional view, on an enlarged scale, of the head portion of the shaving appliance of Figure 1 taken substantially on the line 2—2 of Figures 1 and 3, looking in the direction of the arrows.

A pair of spiders 39 and 40 are fixedly mounted on the reduced hub portions 33 and 34, as by a force fit therebetween. The spiders or supports 39 and 40 may be shaped as shown in Figures 3 and 5. Slots 41 open outwardly through the curved peripheral surface of these spiders. The slots 41 are paired on the respective portions 39 and 40 and serve to support the blades 42.

The type of blade I employ is shown in Figure 7. It comprises central web portions 45 from which project angularly outwardly in opposite directions, the blade portions 43 and 44 bevelled at their cutting edges 46. It may be readily manufactured out of a relatively thin uniformly thick resilient sheet material, such as sheet steel, by bending to form a trough and the laterally diverging blade portions 43 and 44. Parts of the walls of the trough portion are preferably cut away either before or after the forming operation to leave the relatively flexible web portions 45. This arrangement permits the blade portions 43 and 44 to spread and change their angle. The web portions 45 are configured so as to seat in the slots 41 with their cutting edges pointing in opposite directions as shown in Figure 5.

The blade assembly of Figure 5 is readily effected merely by seating the blades 42 in the slots 41. The shaving head assembly is completed by slipping the blade assembly inside the drum 20 and seating the end pieces 25 and 26 on the journal portions 35 and 36 in the position of a closure for the drum ends. This assembly when mounted in the bracket B with the lug 37 in engagement in the slot 38 of the bracket, and the screws 30 and 31 applied as shown, completes the assembly of the entire instrument.

In operation the dry shaver is applied to the surface to be shaved by rolling the drum 20 over it in such a position that one or more of the blades 42 closely overlie the said surface. As the oppositely directed cutting edges alternate in close relation shaving may take place on either the forward stroke or the rearward stroke without the necessity for changing the angle of the handle relatively to the surface to be shaved.

While the drum 20 rolls over the surface to be shaved, the blades 42 are held stationary relatively to the bracket B and the handle C, and as a consequence the inner surface of the drum 20 moves over the cutting edges 46 of the blade 42 and a shearing or clipping action takes place between the edges 46 of the blades 42 and the edges 22 of the perforations 21 in the drum 20.

My invention contemplates that each blade portion be so dimensioned, contoured and related that it will present its cutting edge in the required proximity to the inner surface of the drum for effective cutting and where such proximity shall be merely a rubbing contact and shall not induce a factor of friction of such degree as will tend to impede the free rotation of the cylinder, because any impedance to this free rotation will call for an increased shaving pressure which in turn will tend to irritate and burn the skin. The blade to which the number 43 is applied in Figure 3 will be used to explain how this is effected. This blade as shown in Figure 3 is angled to present its edge to the left of its support 45 and close to the inner surface of the cylinder. This edge will cut hairs only when the cylinder rotates clockwise in Figure 3. The resistance to cutting of a hair encountered by this edge will tend to move the edge clockwise and therefore into closer proximity to the inner surface of the cylinder. This is because the blade can be flexed or angled with reference to its support and that this support is to the rear relatively to the position of the blade edge.

In Figures 8 and 9 I show a modified blade assembly. The blades 52 are generally rectangular with cutting edges 53 preferably bevelled and centrally slotted to leave the webs 57 which connect the blade sections 55 and 56. The blades 52 are shown curved in transverse section and are made of resilient material of such properties that the cutting edges 53 may be made sufficiently hard for the intended purpose.

The blades 52 may be mounted against lateral displacement over bars 61 as shown in Figure 9. These bars may be carried on the perimeter of members 60 which in all other respects may be constructed and supported like the members 39 and 40 of the first embodiment. The drum 62 perforated at 63 surrounds the bracket members 60 in the same way that the drum 20 surrounds the brackets 39 and 40 in the first embodiment. The blade portions 55 and 56 are dimensioned, contoured and related as set forth in connection with the blade portions 43 and 44 of the embodiment of Figure 7 so as to attain the desired proximity for effective cutting without impeding the free rotation of the outer cylinder. To this end the blade portions 56 and 55 are flexible and are presented normally at an angle. The cutting assembly may include a plurality of such blades assembled for example as shown in Figure 5.

In Figure 10 I have shown a blade assembly like that of Figures 8 and 9 except that the blades 72 are normally flat. These blades are each positioned inside the drum over the lugs 81 received in a slot in each blade and the lugs 81 in turn are carried by members 80 all substantially as disclosed in the already described embodiments. These blades may be distorted slightly from their normal flat conformation into the slightly convex conformation shown in Figure 10.

Figure 12:
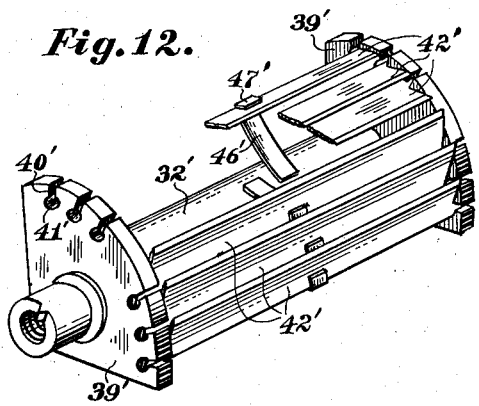
Figure 12 is a view in perspective of the inner cutter assembly of the embodiment of Figure 11.
Figure 13:
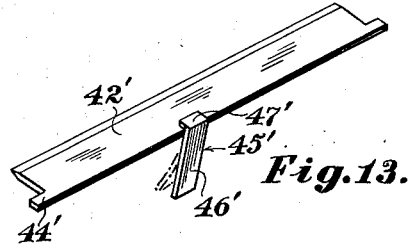
Figure 13 is a view in perspective of one of the cutters of the assembly of Figure 12.
Figure 11:
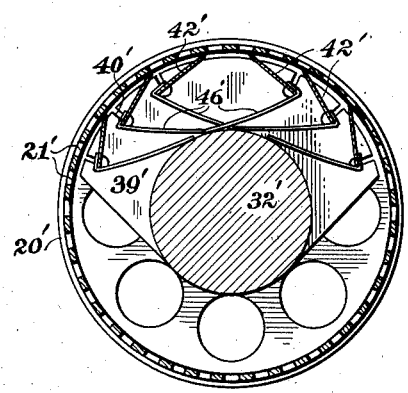
Figure 11 is a transverse view similar to that of Figure 3 taken through a further embodiment.

Figures 11, 12 and 13 show a further embodiment of my blade assembly and mounting. The drum 20' perforated at 21' and its mounting may be as already described in connection with the embodiment of Figure 1, and the description of these parts in Figure 1 will therefore serve also as a description of the corresponding parts in the embodiment now being described. The blade assembly comprises a hub 32' which in all respects is like the hub 32 of Figure 2 except that I have found it convenient to make it dimensionally about as shown in Figure 11 for reasons that will shortly appear. The ends of the hub may be constructed as already described in connection with the first embodiment and as shown in Figure 5 and the description of these parts in the first embodiment will suffice here also. Seated on the hub are the brackets 39' which may take the form shown in Figure 12, the perimeter of these brackets being curved as shown. Extending inwardly from this perimeter are the key hole slots 40' enlarged at their inner ends 41'. It has been found convenient to make these slots generally radially extending. These slots serve to receive the lugs 44' extending outwardly from the ends of the blade 42' (see Figure 13). The dimensions of the slot portions and of the lugs 44' are such that the lugs can be entered into the slots only when they are presented in the general direction of the slots and in the illustrated example, radially, but are free to swing, once the lugs 44' are fully entered and seated in the enlargement 41'. The arrangement of the blades in this embodiment differs from that of the first embodiment in that the blades which are angled in the same direction are grouped together and spaced from a second group of blades angled in the other direction. To hold each blade at that angle to cause its cutting edge to assume a position of approximation to the inner surface of the cylinder for effective cutting performance, I employ a spring 45' with one end secured to the blade as by welding the bent portion 47' thereto. The relationship and the dimensions of the parts just described are such that the body 46' has a wiping engagement with the cylindrical surface of the hub. By increasing the diameter of the hub in this embodiment as previously referred to I am enabled to use a shortened spring which has a number of advantages.

Upon viewing Figure 13 it will be observed that the spring 45' is shown as secured off center to the blade 42' and it will here be stated that the blades are identical in all respects. As a result the blades can be assembled so that the springs 45' of one of the aforementioned groups will be to one side of the center and the springs of the other group of blades to the other side of said center to thus permit of the duplication of the blade construction and its associated springs and yet have the springs of one group out of the zone of interference with the springs of the other group.

Having thus described my invention and illustrated its use, what I claim as new and desire to secure by Letters Patent, is:

1. In a dry shaver, a face engaging plate having an inner surface which is curved and perforated to provide cutting edges, and a curved cutter member supported intermediate its sides and presenting oppositely directed blade portions, the curvature of the cutting member being the reverse of that of the face engaging member.

2. A dry shaver comprising a face engaging member having an inner surface which is curved cylindrically and perforated to provide a cutting edge, in combination with a cutter, a pivot for said cutter below the face engaging member and means for yieldably maintaining the cutter swung to an angle and presenting its cutting edge in adjacency to the inner surface of the cylinder, said means comprising a spring fixed to the blade.

3. For use with a face engaging member of a dry shaver and a cutting blade support, a cutting blade adapted to be mounted on the support for relative movement with reference to said face engaging member, said cutting blade comprising a body portion having a cutting edge along one longitudinal edge and a yieldable member extending from the other longitudinal edge and adapted to engage with the cutting blade support so as to hold the cutting blade in predetermined position with relation to the face engaging member.

4. For use with a face engaging member of a dry shaver and a cutter blade support, a cutting blade unit having a cutting edge along one longitudinal edge and a yieldable member extending from the other longitudinal edge at a point to one side of the center of that edge whereby a plurality of such blades can be employed in the dry shaver in assembled relation, with some blades presenting the yieldable member to one side of the central point of the longitudinal edge from which it extends and the others, to the other side of said central point.

5. A shaving device comprising a stationary member, a pair of spaced supports, an opening in each of said supports positioned in opposition to each other, and a slot running inwardly from the edge of said support to said opening, a cutting blade, and portions projecting from said cutting blade and journalled in said openings, said end portions being of a size so that they will pass through the slots whereby the blade may be mounted on said supports by inserting said end portions into the slots and sliding them into said opening, and spring means connected to said blade and having a portion contacting said fixed member and adapted to maintain said cutting blade in a predetermined angular relation.

6. In a dry shaver a frame, a hollow cylindrical face engaging member mounted for free rotation on said frame so as to be rotatable by traction as the frame is moved across the face, said member having a hair admitting opening therein, a blade provided with a cutting edge, and means for mounting said blade so that its cutting edge is in adjacency to the inner surface of the cylinder, means comprising a yieldable element fixed to the blade and in engaging relation to a portion of the frame.

7. A dry shaver comprising an outer face engaging member having a portion of its inner surface curved cylindrically and perforated for the admission of hairs, and an inner cutting member, the two members being mounted for relative rotation, said inner cutting member being generally bow-shaped in cross section and comprising an intermediate portion and side portions extending angularly from and to the same side of said intermediate portion and also angularly with reference to each other, said inner cutting member being presented with its concave surface in opposition to the inner concave surface of the face engaging member and the edges of said side portions in adjacency to the inner surface of the face engaging member whereby upon a rotation of the face engaging member in one direction relatively to the cutting member, one of said edges will be active for shearing and upon relative rotation of the face engaging member in the opposite direction, the other edge will be active.

8. A dry shaver comprising an outer face engaging member having a portion of its inner surface curved cylindrically and perforated for the admission of hairs, and an inner cutting member, the two members being mounted for relative rotation, said inner cutting member being generally bow-shaped in cross section and comprising an intermediate portion and side portions extending angularly from and to the same side of said intermediate portion and also angularly with reference to each other, said inner cutting member being presented with its concave surface in opposition to the inner concave surface of the face engaging member and the edges of said side portions in adjacency to the inner surface of the face engaging member whereby upon a rotation of the face engaging member in one direction relatively to the cutting member, one of said edges will be active for shearing and upon relative rotation of the face engaging member in the opposite direction, the other edge will be active, and means engaging said intermediate portion to support the inner cutting member in position.

9. A dry shaver comprising a face engaging member having a portion of its inner surface formed cylindrically and a cutter member to cooperate with the cylindrical surface, said cutter comprising a central downwardly projecting supporting portion and angular cutter portions extending outwardly to the same side of said supporting portion and angularly in opposite directions with relation to each other to provide spaced apart cutting edges at their free edges, and means for supporting said cutting edges in contact with said inner surface.

GODFREY DALKOWITZ.